United States Patent [19]

Grube et al.

[11] Patent Number: 5,539,924
[45] Date of Patent: Jul. 23, 1996

[54] METHOD FOR PROVIDING COMMUNICATIONS WITHIN A GEOGRAPHIC REGION

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 209,328

[22] Filed: Mar. 10, 1994

[51] Int. Cl.$^6$ ............................................. H04Q 7/38
[52] U.S. Cl. ........................ 455/34.1; 455/54.1; 379/59
[58] Field of Search .................. 455/33.1, 33.4, 455/53.1, 54.1, 54.2, 56.1, 34.1; 379/59, 60

[56] References Cited

U.S. PATENT DOCUMENTS

| | | | |
|---|---|---|---|
| 4,550,443 | 10/1985 | Freeburg | 455/62 |
| 4,907,290 | 3/1990 | Crompton | 455/56.1 |
| 5,119,504 | 6/1992 | Durdoraw, III | 455/54.1 |
| 5,214,789 | 5/1993 | George | 455/33.4 |
| 5,343,512 | 8/1995 | Wang et al. | 379/59 |

*Primary Examiner*—Edward F. Urban
*Attorney, Agent, or Firm*—Timothy W. Markison; Daniel C. Crilly

[57] ABSTRACT

Communications may be established based on geographic location when a communication resource controller (101) transmits a communication message (119), which includes a message ID (120) a communication payload (121), and a set of geographic coordinates to a plurality of communication units (102, 103). Each of communication units (102, 103) upon receiving the communication message (119), compares its identification code (123) with the message ID (120). If a match occurs, the communication unit (102, 103) then determines its geographic location. Having obtained the geographic location, the unit determines whether its present location is within the area defined by the set of geographic coordinates and, if so, adjust its receiver to receive the communication payload (121).

22 Claims, 3 Drawing Sheets

METHOD FOR PROVIDING COMMUNICATIONS WITHIN A GEOGRAPHIC REGION

FIELD OF THE INVENTION

This invention relates generally to communication systems and, in particular, to geographic location based communications.

BACKGROUND OF THE INVENTION

Communication systems are known to include a communication resource controller, a plurality of communication units, and antennas that transceive a limited number of communication resources. In such communication systems, the communication units communicate with each other via the communication resources, where a communication resource may be an RF channel, a pair of RF channels, a TDM slot, or any medium for carrying RF signals.

To initiate a communication, a communication unit transmits a communication request to the communication resource controller via a communication resource dedicated for control information (control channel). The communication request includes a request for a particular service, such as allocation of a communication resource and identity of a target communication unit(s). For example, the request may be for a group call which identifies all of the communication units in the same group as the initiating communication unit.

Upon receiving this communication request, the communication resource determines whether the communication unit is authorized to access the system and, if so, grants the request. Having granted the request, the communication resource controller allocates a communication resource to the initiating communication unit and the target communication units and then transmits a communication resource allocation message on the control channel. All communication units within the coverage area of the control channel antenna receives the allocation message. However, only the communication units identified in the message, i.e., the initiating and target communication units, will access the allocated communication resource and subsequently partake in the communication.

This method of communication resource allocation works very well in many trunking communication system applications, however, because the coverage area of an antenna can be quite large (typically having a 10 to 30 mile radius), this method has it's limitations. For example, assume that the antenna is centrally located in metropolitan area and the antenna is used by the metropolitan's police force. Further assume that the police force is divided into districts, where each district has its own communication group. With this basic structure, when a police officer initiates a group call for his or her district, all other police officers from that district will receive the group call provided they are within the coverage area of the antenna. If one or more of the receiving police officers are outside of the district, it is impractical for them to receive the call because they are physically unable to respond due to their geographic location, or they may be out of the initiator's jurisdiction. (With the 30 mile coverage radius, a police officer may be up to 60 miles away from the district, making it impossible for him or her to physically respond.) In addition to being unable to physically respond, the police officer's radio is tied up with a communication that he or she can do little about, thus preventing that radio from receiving another call. A call which the officer may be able to respond to based on his or her physical location.

Therefore, a need exists for a method that allows communications to be established based on geographic locations.

DESCRIPTION OF A PREFERRED EMBODIMENT

Generally, the present invention provides a method that establishes communications based on geographic locations. This is accomplished when a communication resource controller transmits a communication message and a set of geographic coordinates to the communication units. Upon receiving the communication message, each communication unit determines whether the identification code contained within the message matches an individual identification code of the communication unit. If the codes match, the communication unit then determines its geographic location and compares its location with the set of geographic coordinates. If the communication unit is within the area defined by the geographic coordinates, unit processes the communication payload. With such a method, communication units only participate in communications if they are within a predefined geographic area, thus eliminating communication units that are physically too far away from the geographic area.

Figure 1:
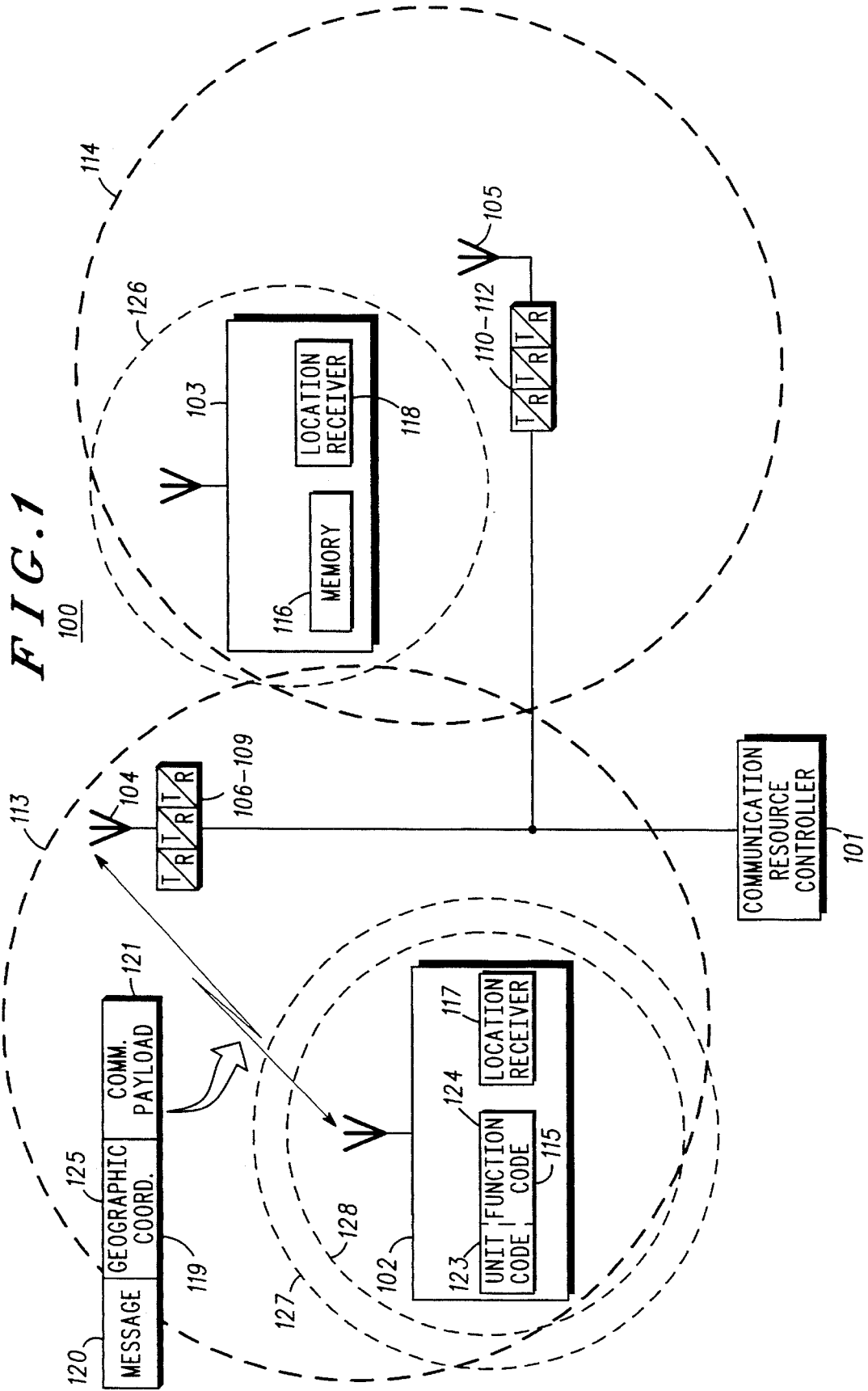
FIG. 1 illustrates a communication system that incorporates the present invention.

The present invention can be more fully described with reference to FIGS. 1–3. FIG. 1 illustrates a communication system (100) that includes a communication resource controller (101), a plurality of communication units (102 and 103), a plurality of antennas (104 and 105) and a limited number of communication resources (106–112). Each of the antennas (104 and 105), which may be coupled to a base station such as Motorola QUANTAR™, has an RF coverage area (113 and 114). Each of the communication units (102 and 103), includes memory (115 and 116), and a location receiver (117 and 118). The memory (115 and 116), which may be RAM, ROM, or any other digital storage element, includes a unit code field (123) and a function code field (124), wherein the unit code and the function code comprise a communication unit identification code. The location receiver (117, 118) may be a Global Positioning Satellite (GPS) receiver that is coupled to a communication processor (not shown).

Within the communication system (100), any of the communication units (102, 103) may initiate a communication by transmitting a request to the communication resource controller (101). The communication resource controller (101), which may be a Motorola trunking central controller, processes the request and prepares a communication message (119) based on the request. For example, if the request was for a group call, the communication message (119) would include a target message ID code (120) which identifies a particular group for which the group call was requested, a communication payload (121), and a set of geographic coordinates (125). The communication payload (121) may be voice messages, data messages, graphical images, files, or a request for information. In addition, the message ID code (120) may include a function code that instructs the receiving communication unit to respond. For example, the function code may request an acknowledgment signal, an action to be performed, or send location.

Regardless of the content of the communication message (119), the message is transmitted via the antenna (104, 105). If a communication unit (102, 103) is within the antenna RF coverage area (113, 114)), it will receive the communication message (119). Upon receiving the communication message (119), the unit determines whether the target code and function code of the message code (120) matches the communication units group code or individual code (123) and the function code (124). If a match occurs, the communication unit then determines its location and if the unit is located within the area (126 or 127) defined by the set of geographic coordinates. If the communication unit is within the geographic communication area (126), the unit then adjusts it receiver to receive the communication payload.

The first geographic communication area (126) is pre-established based on desired coverage area of a particular communication and is independent of the coverage areas (113, 114) of the antennas (104, 105). Thus, the geographic communication area (126) may be as large or as small as needed by the users, may extend across the coverage areas of several antennas and be centered about the communication unit that initiated the group call. Alternatively, the second geographic coverage area (127) includes an exclusion area (128), which may be centered about the initiating communication unit. While the first and second areas (126, 127) are shown to be circular, any geometric shape can be defined by the set of geographic coordinates, however, a center point and a radius require the least amount of bandwidth to transmit. To illustrate this consider the logic diagram of FIG. 2.

Figure 2:
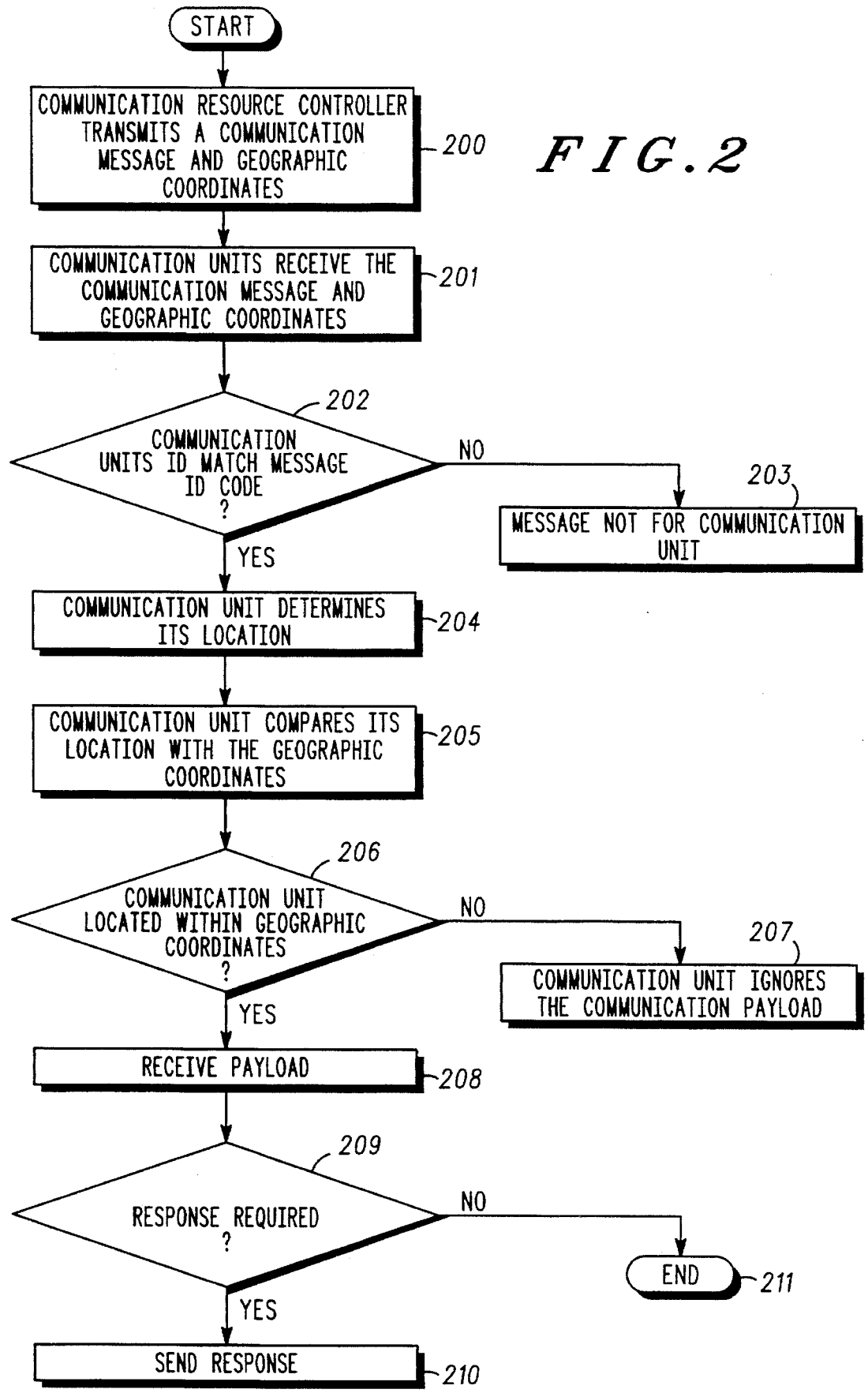
FIG. 2 illustrates a logic diagram that may be used to implement the present invention.

FIG. 2 illustrates a logic diagram that may be used to implement the present invention. At step 200, the communication resource controller transmits a communication message and a set of geographic coordinates via a control channel. As mentioned above, the communication message includes a message ID code and a communication payload. A communication unit that is located within the antenna RF coverage area (113, 114) receives the communication message and the set of geographic coordinates (201) and determines whether its identification code matches the message identification code (202). If a match does not occur (202) the communication unit determines that this particular message is not for the unit (203).

If, however, a match does occur (202), the communication unit determines its location via the location receiver (204) Having obtained this information, the communication unit compares its present geographic location with the area defined by the set of geographic coordinates (205). The communication unit then determines whether it is within the area defined by the set of geographic coordinates (206). If the communication unit is not within the area (206), the communication unit ignores the communication payload (207).

When the communication unit is located within the geographic communication area (206), the communication unit receives the communication payload (208). Upon receiving the communication payload, the communication unit determines whether a response is required (209), wherein the response request would be included as part of the function code (see above). If so, the communication unit responds to that request (210). If no response is required (209) the process ends (211).

Figure 3:
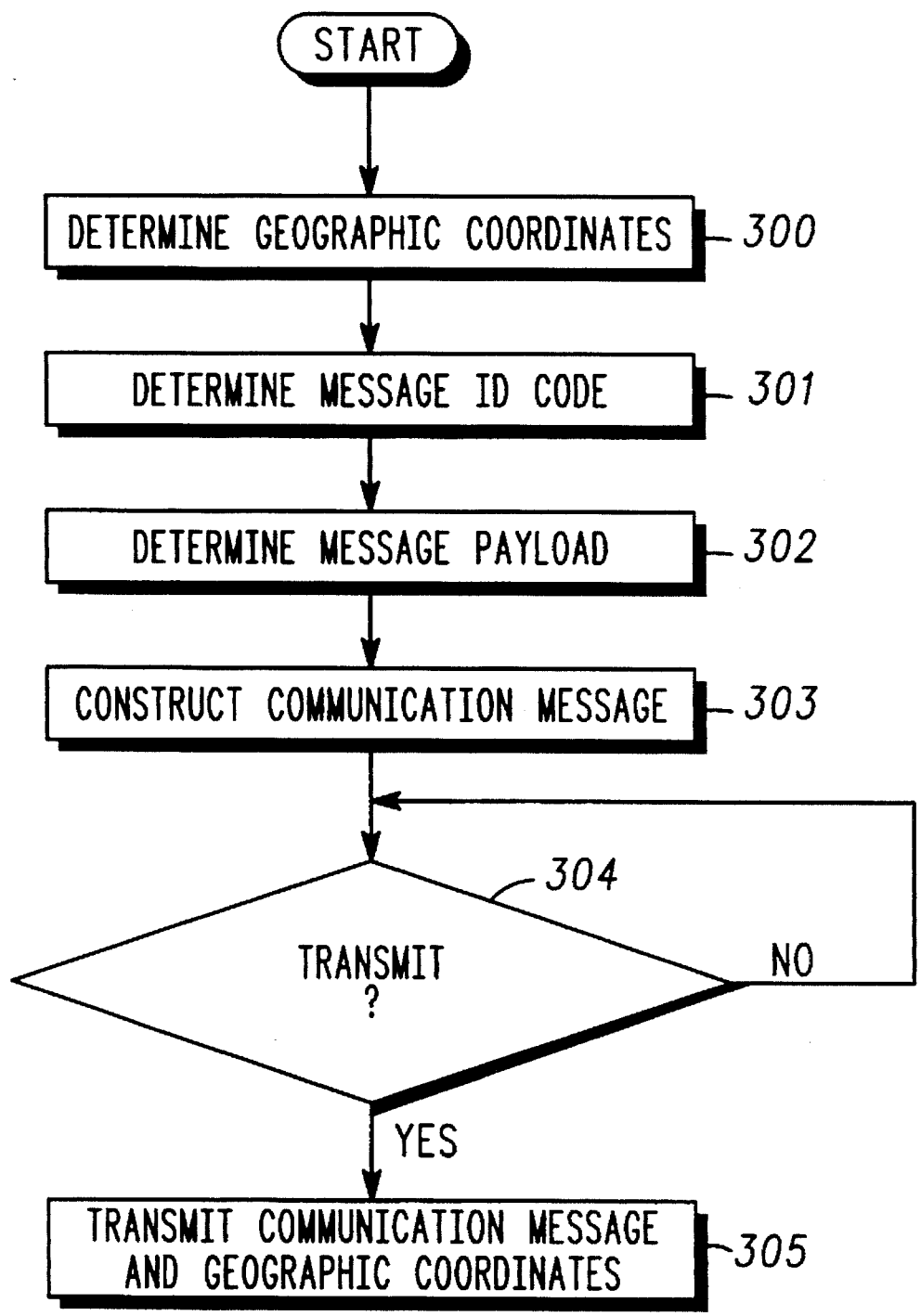
FIG. 3 illustrates a logic diagram that may be used to implement an alternate embodiment of the present invention.

FIG. 3 illustrates a logic diagram that a communication unit may use to incorporate the present invention. At step 300, the unit determines geographic coordinates of a geographic communication area. This determination is based on the area in which the communication unit desires its audience to be located in. Having determined this information, the communication unit then determines the message ID code (301). As mentioned above, the message ID code includes the identification code of either a target communication group or an individual target communication unit. In addition to determining the message ID code, the communication unit also determines a communication message payload (302). As discussed above, the communication message payload may be voice speech messages, graphic images, data, files, etc. With this information defined, the communication unit then constructs a communication message (303). Subsequently, the communication unit transmits the communication message (304) and the geographic coordinates (305). Upon receipt of this information, the target communication unit(s) will follow steps 201-211 in the above described process of FIG. 2.

The present invention provides a method that allows communications to be established based on geographic areas. With such a method, communication units located within a geographic communication area can participate in the communication, while units not within the area, even though they are part of the communication group, will not participate. This focuses group calls to units that are physically close together and thus more likely to be able to help each other than a unit that is too far away. In addition, units that are not within the communication area are free to receive other calls in which they may be able to provide assistance.

We claim:

1. In a communication system that includes a communication resource controller, a limited number of communication resources that are transceived via an antenna, and a plurality of communication units, a method for providing communications within a geographic region, the method comprises the steps of:

a) allocating, by the communication resource controller, a communication resource to a communication unit of the plurality of communication units to produce an allocated communication resource;

b) transmitting, by the communication resource controller, a communication message and a set of geographic coordinates that define a geographic communication area to the communication unit via the allocated communication resource, wherein the communication message includes a message identification code and communication payload and wherein the set of geographic coordinates are independent of radio frequency coverage area of the antenna;

c) upon receiving the communication message, determining, by the communication unit whether the message identification code matches an identification code of the communication unit;

d) when the message identification code matches the identification code of the communication unit, determining, by the communication unit, a location of the communication unit and whether the location of the communication unit is within the geographic communication area; and e) when the location of the communication unit is within the geographic communication area, processing, by the communication unit, the communication payload.

2. The method of claim 1 further comprises, ignoring, by the communication unit, the communication payload when the location of the communication unit is not within the geographic communication area.

3. In the method of claim 1, step (e) further comprises receiving data as the communication payload.

4. In the method of claim 1, step (e) further comprises receiving a speech message as the communication payload.

5. In the method of claim 1, step (e) further comprises receiving a graphical image as the communication payload.

6. In the method of claim 1, step (c) further comprises determining whether a target code of the message identification code matches a unit code of the identification code and whether a function code of the message identification code matches one of a set of function codes of the identification code.

7. The method of claim 1 further comprises transmitting, by the communication unit, a response to the communication payload.

8. The method of claim 7 further comprises transmitting, by the communication unit, the location of the communication unit as the response.

9. In the method of claim 1, step (b) further comprises transmitting as the set of geographic coordinates a geographic point and a first radius that defines a perimeter of the geographic communication area.

10. In the method of claim 1, step (b) further comprises transmitting as the set of geographic coordinates a first set of coordinates that define the geographic communication area and a second set of coordinates that define an exclusion area within the geographic communication area.

11. A method for a communication unit to participate in communications based on geographic location, the method comprises the steps of:

a) receiving, via a communication resource allocated to the communication unit by a communication resource controller and radiated from a transmitting antenna coupled to the communication resource controller, a communication message and a set of geographic coordinates that define a geographic communication area, wherein the communication message includes a message identification code and communication payload and wherein the set of geographic coordinates are independent of radio frequency coverage area of the transmitting antenna;

b) determining whether the message identification code matches an identification code of the communication unit;

c) when the message identification code matches the identification code, determining a location of the communication unit and whether the location of the communication unit is within the geographic communication area; and d) when the location of the communication unit is within the geographic communication area, processing the communication payload.

12. The method of claim 11 further comprises, ignoring the communication payload when the location of the communication unit is not within the geographic communication area.

13. In the method of claim 11, step (d) further comprises receiving data as the communication payload.

14. In the method of claim 11, step (d) further comprises receiving a speech message as the communication payload.

15. In the method of claim 11, step (d) further comprises receiving a graphical image as the communication payload.

16. In the method of claim 11, step (b) further comprises determining whether a target code of the message identification code matches a unit code of the identification code and whether a function code of the message identification code matches one of a set of function codes of the identification code.

17. The method of claim 11 further comprises transmitting, by the communication unit, a response to the communication payload.

18. The method of claim 17 further comprises transmitting, by the communication unit, the location of the communication unit as the response.

19. In the method of claim 11, step (a) further comprises transmitting as the set of geographic coordinates a geographic point and a first radius that defines a perimeter of the geographic communication area.

20. In the method of claim 11, step (a) further comprises transmitting as the set of geographic coordinates a first set of coordinates that define the geographic communication area and a second set of coordinates that define an exclusion area within the geographic communication area.

21. In a communication system that includes a communication resource controller, a limited number of communication resources that are transceived via an antenna, and a plurality of communication units, a method for providing communications within a geographic region, the method comprises the steps of:

a) allocating, by the communication resource controller, a communication resource to a group of communication units to produce an allocated communication resource, the group of communication units including at least two of the plurality of communication units;

b) transmitting, by the communication resource controller, a communication message and a set of geographic coordinates that define a geographic communication area simultaneously to the group of communication units via the allocated communication resource, wherein the communication message includes a message identification code and communication payload and wherein the set of geographic coordinates are independent of radio frequency coverage area of the antenna;

c) upon receiving the communication message, determining, by each communication unit of the group of communication units, whether the message identification code matches an identification code of the group of communication units;

d) when the message identification code matches the identification code of the group of communication units, determining, by each communication unit of the group, a present location and whether the present location is within the geographic communication area;

e) processing, by each communication unit of the group within the geographic communication area, the communication payload; and f) ignoring, by each communication unit of the group outside the geographic communication area, the communication payload.

22. A method for a communication unit to participate in group communications based on geographic location, the method comprises the steps of:

a) receiving, via a communication resource allocated by a communication resource controller to a plurality of communication units that include the communication unit and radiated from a transmitting antenna coupled to the communication resource controller, a communication message and a set of geographic coordinates that define a geographic communication area, wherein the communication message includes a message identification code and communication payload and wherein the set of geographic coordinates are independent of a radio frequency coverage area of the transmitting antenna;

b) determining whether the message identification code matches an identification code of the plurality of communication units;

c) when the message identification code matches the identification code of the plurality of communication units, determining a location of the communication unit and whether the location of the communication unit is within the geographic communication area;

d) when the location of the communication unit is within the geographic communication area, processing the communication payload; and e) when the location of the communication unit is outside the geographic communication area, ignoring the communication payload.

* * * * *